United States Patent [19]

Yair et al.

[11] Patent Number: 5,787,196
[45] Date of Patent: Jul. 28, 1998

[54] METHOD AND APPARATUS FOR SPLITTING CONNECTED CHARACTERS INTO COMPONENT CHARACTERS

[75] Inventors: Eyal Yair; Oren Kagan, both of Haifa, Israel

[73] Assignee: International Business Machines Corporation, Armonk, N.Y.

[21] Appl. No.: 752,745

[22] Filed: Nov. 21, 1996

Related U.S. Application Data

[63] Continuation of Ser. No. 336,154, Nov. 8, 1994, abandoned.
[51] Int. Cl.$^6$ ............................. G06K 9/34; G06K 9/00; G06K 9/46; G06K 9/66
[52] U.S. Cl. ...................... 382/178; 382/187; 382/259; 382/195; 382/194; 382/204
[58] Field of Search ....................... 382/173, 177, 382/178, 179, 187, 199, 205, 254, 258, 259, 191, 195, 194, 203, 204

[56] References Cited

U.S. PATENT DOCUMENTS 4,933,977  6/1990  Ohnishi et al. ........................ 382/9
5,034,992  7/1991  Kumagai ............................... 382/54

OTHER PUBLICATIONS

Ieee Pacific RIM Conf. on Communications, Computers & Signal Processing, "Separation and Recognition of Connected Capital English Characters" V.C.R. Ting Jun. 4–5, 1987.

Proceedings of the IEEE V. 80, No. 7, "Major Components of a Complete Text Reading System"S. Tsujimoto and H. Asada, pp. 1133–1149.

*Primary Examiner*—Bipin Shalwala
*Attorney, Agent, or Firm*—James E. Murray

[57] ABSTRACT

Image processing apparatus is disclosed for splitting, for subsequent storage or processing by OCR apparatus, character images in digital form comprising connected characters, the image processing apparatus extracts an image skeleton from an input image and represents the topology of the image skeleton in a first data structure; generates, from the first data structure, second data structures representing the topologies of the results of possible splits of the input image skeleton; evaluates the second data structures and selects one of the possible splits to thereby split the input image.

16 Claims, 5 Drawing Sheets

```
      x                             1
     xx                            11
    xxxx                          1xx1
    xxxx                          1xx1
    xxxx                          1xx1
   xxxxxx                        1xxxx1
    xxxxx                        1xxx1
   xxxxxx                        1xxxx1
    xxxxx                        1xxx1
    xxxx                          1xx1
     xxx                          1x1
     xx                            11
```

FIG. 3a                    FIG. 3b

```
  1
 11
12o1          depth = (2,0,0,0,1)
12o1          depth = (2,0,0,0,1)
12o1          depth = (2,0,0,0,1)
12xx21
12x21
12xx21
12x21
12o1          depth = (2,0,0,0,1)
1o1           depth = (2,1,0,0,0)
 11
```
FIG. 3c

```
  1
 11
12o1          depth = (2,0,0,0,1)
12o1          depth = (2,0,0,0,1)
12o1          depth = (2,0,0,0,1)
123o21          depth = (3,0,0,0,1)
12o21           depth = (3,0,0,0,0)
123o21          depth = (3,0,0,0,1)
12o21           depth = (3,0,0,0,0)
12o1          depth = (2,0,0,0,1)
1o1           depth = (2,1,0,0,0)
 11
```
FIG. 3d

```
  .
 ..
..o.          depth = (2,0,0,0,1)
..o.          depth = (2,0,0,0,1)
..o.          depth = (2,0,0,0,1)
...o..          depth = (3,0,0,0,1)
..o..           depth = (3,0,0,0,0)
...o..          depth = (3,0,0,0,1)
..o..           depth = (3,0,0,0,0)
..o.          depth = (2,0,0,0,1)
.o.           depth = (2,1,0,0,0)
 ..
```
FIG. 3e

```
*x
*xox                    FIG. 8a
*x
```

```
 x*
 xxx*
 xxoxx*                 FIG. 8b
*xxx*
*x*
 *
```

```
 *x
 *xox        depth = (2,0,0,0,1)
 *xox        depth = (2,0,0,0,1)
 *xox        depth = (2,0,0,0,1)
*xxoxx       depth = (3,0,0,0,1)
 xxoxx       depth = (3,0,0,0,0)
*xxoxx       depth = (3,0,0,0,1)
 xxoxx       depth = (3,0,0,0,0)
 *xox        depth = (2,0,0,0,1)
  xox        depth = (2,1,0,0,0)
  x.
```

METHOD AND APPARATUS FOR SPLITTING CONNECTED CHARACTERS INTO COMPONENT CHARACTERS

This is a continuation of application Ser. No. 08/336,154, filed Nov. 8, 1994 now abandoned.

The invention relates to improvements in the processing of images of written or printed characters, such as is involved in optical character recognition (OCR). More particularly, the invention is concerned with improved apparatus and methods for splitting connected components of an image for subsequent storage or processing by OCR apparatus.

In many OCR applications where an image of a box of text is to be recognised, characters touch each other. This occurs especially in handwritten text, for example zip codes, amount of cheques, amounts on tax forms, and the like or in low quality images of printed text such as fax output and photocopies. In order to enable utilisation of an OCR engine which accepts as an input a single character, the connected characters must be separated prior to OCR invocation.

Most known splitting techniques seek for a linear boundary between the two sub-components. In F. Kimura and M. Shridhar, "Recognition of connected numeral strings", ICDAR-91, "1st intl. conf. on document analysis and recognition", pp. 731-739, October 1991, a method for finding an optimal linear boundary between the comprising components is suggested and compared to a vertical optimal boundary. Reported results are 40% correct splits for the vertical splitting boundary, 46% correct splits for the maximum separability direction and 720.7% correct splits after adding heuristic postprocessing algorithms that locally improve the split.

In O. Matan et al. "Reading handwritten digits:a zip code recognition system" Computer, pp. 59-62, July 1992, a vertical split algorithm for zip codes is proposed which works in a handshake mode with an OCR process that helps find the four locations of the split in a zip code of five digits, where the split is carried out by cutting the images with vertical lines.

U.S. Pat. No. 5,267,326 discloses a segmentation technique in which non-linear cuts are made using the method of steepest descents applied to a potential field derived from the image.

However, these types of solutions are generally too simple to enable robust and reliable character separation and in many cases rely on a priori knowledge of the number of characters in the string.

It is an object of this invention to overcome these drawbacks of the prior art.

According to the present invention, there is provided image processing apparatus for splitting, for subsequent storage or processing by OCR apparatus, character images in digital form comprising connected characters, the image processing apparatus comprising: logic for extracting an image skeleton from an input image and representing the topology of the image skeleton in a first data structure; logic for generating, from the first data structure, second data structures representing the topologies of the results of possible splits of the input image skeleton; and means for evaluating the second data structures and selecting one of the possible splits to thereby split the input image.

The inventors have found that, in this way, a robust solution is provided to the problem of character separation for OCR applications of numeral handwritten or printed text. Complex touching topologies can be handled and long strings can be separated without any a priori knowledge of the number of characters contained in the string. The apparatus can be used, for example, as a pre-processor for or in a handshake mode with an OCR module for OCR applications.

Whilst the invention has been developed in the context of a preprocessor for OCR applications, the possibility that such a character image splitting technique may have other applications is not excluded.

It is known in some implementations of OCR to employ topological representations as an aid to character recognition, see for example EP-A-45549. However it has not heretofore been suggested that such representations can provide a useful basis on which to split character images.

Suitably, the first and second data structures are graphs comprising nodes and branches. Preferably, graphs comprising more than one branch are split at nodes and graphs comprising only one branch are split at pixels in the branch to generate the second data structures.

The second data structures can, advantageously, be arranged so that character images can be reconstructed therefrom. In this case, the apparatus preferably comprises logic for generating character images from the second data structures. It is possible, however, that the topological representations themselves be of use as input to, eg, an OCR engine.

In a preferred embodiment, the first and second data structures comprise a depth vector for each pixel located on the image skeleton, the depth vector representing the shortest distance from the pixel to the edge of the character in the input image. For improved accuracy in the preferred embodiment, the depth vector comprises error components, representing the distance from the pixel location to the location in the image of the image skeleton in each of the major directions.

The means to evaluate the second data structures can comprise means defining a cost function for an image split and means to evaluate the cost function from the second data structures. A suitable cost function can be based on the row and column overlap of the image skeletons represented by the second data structures.

Also provided is optical character recognition apparatus for recognising images comprising connected characters, the apparatus comprising optical character recognition logic for associating single character codes with images and image processing apparatus as described above.

Viewed from another aspect there is provided a method for segmenting, for subsequent storage or processing by OCR apparatus, character images in digital form comprising connected characters, comprising the steps of: extracting an image skeleton from an input image and representing the topology of the image skeleton in a first data structure; generating, from the first data structure, second data structures representing the topologies of the results of possible splits of the input image skeleton; and evaluating the second data structures and selecting one of the possible splits to thereby segment the input image.

To handle long strings of connected characters, the method preferably comprises iteratively segmenting the images represented by the second data structures by generating, from the second data structures, further data structures representing the topologies of the results of possible splits of the image skeletons represented by the second data structures; and evaluating and splitting the further data structures until the input image is segmented into images containing single characters.

BRIEF DESCRIPTION OF THE DRAWINGS

An embodiment of the invention will now be described, by way of example only, with reference to the accompanying drawings wherein:

FIGS. 3–10 are images of handwritten information which illustrate and exemplify the image splitting process.

DETAILED DESCRIPTION

Figure 1:
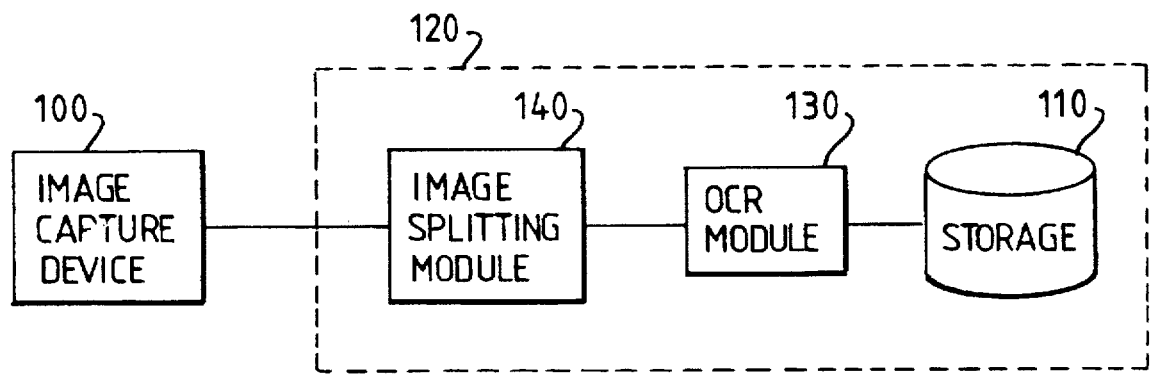
FIG. 1 is a schematic diagram showing apparatus for machine reading of printed or handwritten information.

Referring to FIG. 1, apparatus for machine reading of printed or handwritten text comprises an image capture device 100 of any suitable known type, which may be, for example, an image capture camera or an optical scanner. Such a device generates an electronic signal representative of the markings on a document. The image is digitised in the form of a bi-level bitmap comprising rows and columns of binary pixels and stored in a suitable format in a data storage device 110. The signal from the image capture device 100 is passed to a data processing system 120 which includes data storage device 110, OCR module 130, and image splitting module 140.

In this embodiment the data processing system is a general purpose computer workstation of conventional type which operates under the control of suitable programs to carry out the image processing and recognition tasks described herein. The computer workstation could be, for instance, one of the IBM RISC SYSTEM/6000 family of computers (IBM and RISC SYSTEM/6000 are trademarks of International Business Machines Corporation).

It will be understood, however, that the invention could be implemented in the form of hardware using specially designed circuits or using any combination of special or general purpose hardware or software.

OCR module 130 is of conventional type and can employ any one of the many known OCR techniques. The function of the OCR module is to take as input an image in digital form which notionally contains only a single character, to identify which one of a number of characters in a finite character set the image most closely corresponds and to associate with the image a digital code corresponding to the character.

Since the apparatus of this embodiment is primarily designed to process handwritten text, the OCR module is of a type which is capable of recognising handwritten characters.

Image splitting module 140 takes as input a character image in digital form which is thought to contain two or more characters which are connected together. The task of the image splitting module 140 is to generate images which are thought to contain only a single character for input to the OCR module. In other words, the image splitting module 140 must process the character images to split the connected characters into their single character components.

It will be understood that the image generated by image capture device 100 could contain more than one connected component and that well known techniques exist to identify such connected components within, for instance, a page of text and pass them one by one to the image splitting module 140. For the purposes of this discussion however it will be assumed that the image captured by image capture device 100 contains only one such connected component.

Figure 2:
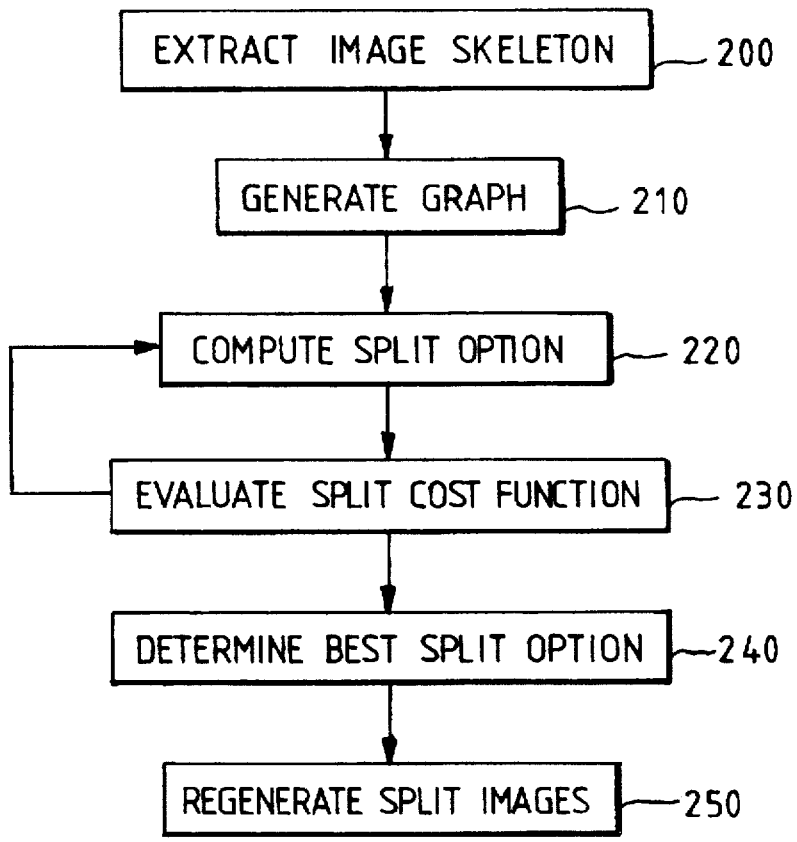
FIG. 2 is a flow diagram showing an image splitting process.

FIG. 2 is a general flow diagram which shows the different logical elements which make up the image splitting module 140 and the sequence in which they operate.

The separation process proceeds through the following steps:

1. SKELETON EXTRACTION AND GRAPH REPRESENTATION

First, the character line width is removed in step 200 by extracting the image skeleton, and the image is represented by a topological graph of nodes and branches which is stored in memory.

The skeleton is represented in such a way that will allow image reconstruction at a later stage after the split has been carried out.

The skeleton representation is obtained by iterative removal of the image contour as explained in more detail below. To enable the image to be reconstructed, to each skeleton pixel is attached a depth attribute. The depth attribute of each skeleton pixel contains the number of contour layers that were removed before that pixel was declared to be a skeleton pixel, and an additional adjustment bit for each of the four major directions. These additional bits compensate for errors introduced by assymmetry in the contour removing process.

This representation of the depths of the skeleton pixels enables high quality image reconstruction of the image, or any of its sub images, from the skeleton or any of its sub skeletons. The skeleton is represented by a graph where each junction is a graph node, and each skeleton portion between two adjacent nodes is a graph branch. This graph records the topological structure of the image on which the separation process is based.

The process of skeleton extraction, skeleton processing, and image reconstruction is demonstrated in FIGS. 3a–e.

The image skeleton is extracted by an iterative process. In each iteration pixels are peeled off along the outer contour of the image, provided that connectivity is not damaged. At each such iteration an accumulator is incremented. Whenever a skeleton pixel is revealed, the current value of the accumulator, which equals to the number of peeling iterations required to reveal this skeleton pixel, is assigned as the depth value of that pixel. This depth value is also the distance, measured in number of pixels, to the nearest 'white' pixel of the image. This modified skeleton is thus represented by an array of pixels, where each pixel is represented by its location (x,y) in the image, and its depth value.

However, in order to enable good reconstruction of the image from this modified skeleton the above accuracy of the depth value is insufficient due to quantization error introduced in lines having width equal to an even number of black pixels. The "ideal" skeleton should pass along the ridge of the image. However, in lines having widths of an even number of pixels the ridge passes between pixels (e.g. for line having width of 6 pixels the skeleton should be located between the 3rd and 4th pixels). Representing skeleton depth by integers and forcing skeleton pixels to be located in image pixel locations introduces an error of half a pixel.

To alleviate this problem, the depth value of each skeleton pixel has associated with it a depth vector which contains four depth components, for the 4 major directions: up, down, right, left. The depth vector is represented by the following sets of numbers:

1. a depth value corresponding to the distance of the pixel to the nearest 'white' pixel in the image.

2. 4 binary adjustment numbers (bits), one for each of the four major directions (up, down, left, right) that should be added to the above integer depth as adjustments for even/ odd line width in each of these major directions.

The full depth attribute of a pixel is thus represented by a 5-dimensional vector denoted by (depth,u,d,r,l) which we call the depth vector, where: depth is the depth value, u is the up-adjustment bit, d is the down-adjustment bit, r is the right-adjustment bit, and l is the left-adjustment bit.

Computation of the depth vector is carried out as follows: At each iteration, the peeling algorithm visits each of the contour pixels and decides whether the pixel belongs to the skeleton or not based on neighbourhood connectivity. Then, the depth is determined as follows:

(1) if the pixel is not a skeleton pixel it is marked as a removable pixel and the current value of the accumulator is associated with it as the pixel depth value. Non-skeleton pixels are associated only with depth value and not the depth vector. This depth value is used to determine the adjustment bits of neighbouring skeleton pixels as is explained below.

(2) Otherwise, the pixel is marked as a skeleton pixel with depth vector (depth,u,d,r,l) defined as follows: depth is equal to the current accumulator value, u is set to ON if the upper pixel was visited and its depth value is equal to the current accumulator value. Else, it is set to OFF. This u-bit, if ON, indicates that the real position of the skeleton is effectively half a pixel above the position of the skeleton pixel. Hence using this bit improves the accuracy of skeleton representation in the upwards direction. d is set in a similar way in the 'down' direction. r is set in a similar way in the 'right' direction and l is set in a similar way in the 'left' direction.

For example, consider the image shown in FIG. 3a representing a single line. After the first peeling iteration the image shown in FIG. 3B is obtained, where the visited pixels are all marked as 'removable' pixels and were associated with depth value equal to 1.

In this embodiment, the visiting order of pixels is carried out counter-clockwise. After the second peeling iteration the image shown in FIG. 3c is obtained, where the pixels marked by '2' are the removable pixels of this iteration, having depth value of 2, and the pixels marked by 'o' are skeleton pixels whose depth vector is specified in the figure (as depth =. . . ). In the above figure, each depth vector is associated with the skeleton pixel that appears on the same row.

After the third and final peeling iteration the image shown in FIG. 3d is obtained, where the skeleton image is obtained, if desired, by omitting all the 'removable' pixels, which yields the image shown in FIG. 3e.

The elements of the Depth vector are packed into an integer word of 16 bits such that the left 12 MSB bits hold the depth value and the right 4 LSB bits are used for the 4 adjustment bits. The peeling algorithm could be arranged to create a new image at each peeling stage as illustrated in FIG. 3. However, using a packed depth word of 16 bits, the computation can be carried out on a single image with 16 bits/pixel. All the peeling stages work on the same image by updating the depth attribute of the image pixels. Such a computation is called in-place computation.

Each skeleton image of a connected component (CC) is represented by and stored as a graph data structure which contains the following information:

(1) the number of graph nodes;
(2) an array containing all the graph nodes;
(3) the number of graph branches;
(4) an array containing all the graph branches.

Each graph node is a data structure containing the following information:

(1) the node ID, which is an integer;
(2) the node rank which is the number of branches connected to the node. The node rank can be either 1, 3 or 4;
(3) an array containing the branch IDs of all the branches connected to the node, which will be referred to as adjacent branches;
(4) an array containing the node IDs on the other end of all the adjacent branches, which will be referred to as adjacent nodes;
(5) the node depth vector packed into a binary word of 16 bits as explained above.
(6) the node location (x,y) in the image coordinate system.

Each graph branch is a data structure containing the following information:

(1) the branch ID, also an integer;
(2) the branch starting node, ie the ID of the node at the starting end of the branch;
(3) the branch ending node, ie the ID of the node at the ending end of the branch;
(4) the number of pixels which make up the branch;
(5) an array of the x and y coordinates of all the branch pixels;
(6) an array of the packed depth vectors of all the branch pixels.

2. COMPUTE SPLIT OPTIONS

The rank of a node is the number of branches connected to it. When creating the graph from the skeleton of the image via the above peeling algorithm, three types of nodes can possibly occur, which have ranks of 1, 3 or 4. A node of rank 1 is a leaf node, which occurs at the edge of a branch.

In practice, as a consequence of the method of skeleton extraction, a node of rank 4 almost never occurs because a crossing of two lines will generally result in two nodes of rank 3 situated very closely to each other. Hence, for simplicity, in the following discussion the existence of nodes of rank 4 will be neglected and it will be assumed that all the graph junctions occurs at nodes of rank 3. However, if it were necessary, the treatment given to a rank 4 node would be a straightforward extension of the treatment given to a rank 3 node.

A distinction is drawn between two types of graphs: SBG Single Branch Graph: a graph that contains a single branch. MBG Multi Branch Graph: a graph that contains more than one branch.

Figures 4, 5, 6, 7:
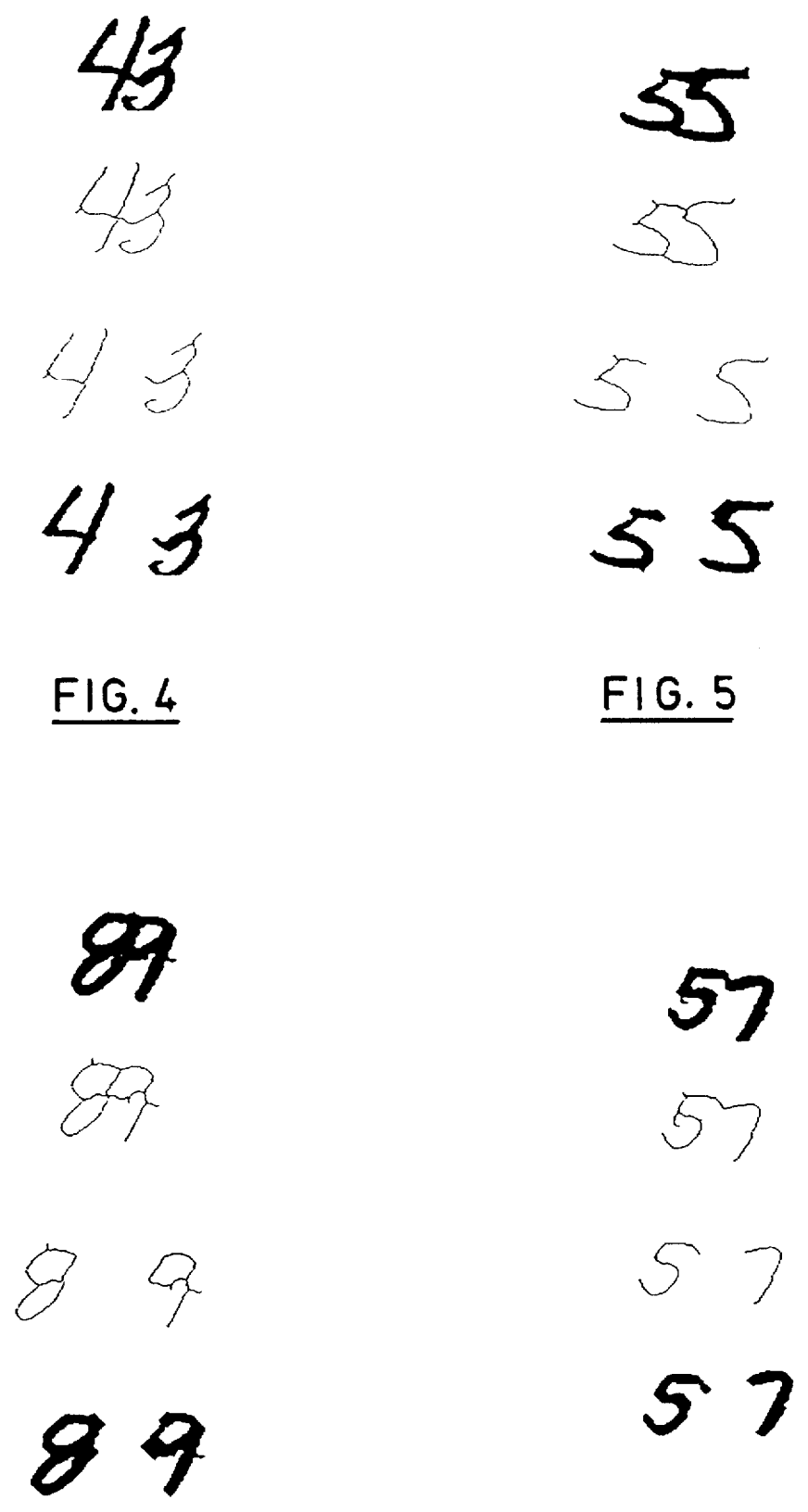

There are basically two types of graph splits for MBG graphs which are illustrated in FIGS. 4–6.

(1) Split in a single node by disconnecting a single branch from the node as shown in FIG. 4.
(2) Split simultaneously in two nodes by disconnecting a single branch from each node as shown in FIG. 5.

A variant of the second type is to split simultaneously in two nodes while duplicating the branch or branches between them such that it appears in both sub-graphs. This is shown in FIG. 6.

An SBG graph is separated in a branch pixel by cutting the single graph branch in a certain branch pixel as shown in FIG. 7.

Other types of required graph split have been found to occur in less than 1% of cases, and they can be treated, if necessary, by the same principles as the treatment given to the above cases.

After evaluating the graph from the image, all possible split options are listed in step 220. These options include all the afore-mentioned graph splits that yield two disjoint sub-graphs.

For an SBG graph, heuristics are imposed in order to reduce the number of possible splitting points. In this embodiment, this is carried out by making splits only in branch pixels that are either switch points, in other words if at that point the branch has a second derivative which changes sign, or if no other graph pixels exist in the same column in the y (up-down) direction. It will be understood that other heuristics of a similar nature could be applied.

3. EVALUATE COST FUNCTION

A cost value is computed in step 230 for each of the split options.

A graph split step (GSS) 220 is a process that splits a given graph into two disjoint sub-graphs. A cost function is defined that represents the quality of the split. The leading principle in selecting the cost function is the understanding that each sub-graph should represent either a single character or a string of characters, but not part of a character. This principle will allow a graph representing a string of connected characters to be split into the individual characters by successive application of the GSS module.

In this embodiment, which has been specifically designed for images containing numerals, that have about the same height but might differ in their width, the cost function is arranged to maximise the overlap of the two sub-graphs along the vertical axis (the y-axis) and minimise their overlap along the horizontal axis (the x-axis).

Let us define the following quantities:
$LER_i$ the Least Enclosing Rectangle of the i-th sub-graph (i=1,2)
Y the overall height of the underlying image of the graph
X the overall width of the underlying image of the graph
$L_x$ the overlap between the two LERs along the x-axis
$L_y$ the overlap between the two LERs along the y-axis
$Y_{min}$ the height of the shorter LER
$X_{min}$ the width of the narrower LER
$X_{max}$ the width of the wider LER.

The cost function for an MBG graph is defined by:

$$MGB\_cost = \alpha_1 \frac{L_x}{X} + \alpha_2 \frac{Y - L_y}{Y} + \alpha_3 \frac{L_x}{X_{min}}$$

and the cost for an SBG graph is defined by:

$$SBG\_cost = \beta_1 \frac{Y - L_y}{Y} + \beta_2 \frac{L_x}{X_{max}} + \beta_3 \frac{L_x}{X_{min}}$$

The weighting coefficients in each cost function are chosen to sum up to unity, yielding a cost value in the range [0,1].

The following values for the weighting coefficients have been found to be adequate for most cases of handwritten text:

$\alpha_1=0.30$, $\alpha_2=0.55$, $\alpha_3=0.15$,
$\beta_1=0.60$, $\beta_2=0.25$, $\beta_3=0.15$.

It should be noted that more emphasis is given to increase the overlap along the y-axis than to decrease it on the x-axis. This characteristic means that this cost function is especially suited for numerals which all have about the same height, even in handwritten text.

4. GRAPH SPLIT

The split of the input image is accomplished in step 240 by choosing the split option for which the cost is minimal, if this cost is below a predefined threshold. If the splitting cost is above the threshold it is most likely that the component already contains only a single character and therefore processing is terminated.

It will be understood that if the image splitting module is combined with an OCR module as in this embodiment, an OCR "reject" feedback could be used to filter the splits which may cause the second best split, or other splits for which the cost function is higher, to be selected.

The graph split logic 220, 230, 240 step may be invoked as many times as required to split a string into its comprising digits. Graph splits of long strings are thus obtained by applying the GSS procedure to the sub-graphs of the previous step as many times as required, if the number of digits in the string is known, or as long as the split costs are below the threshold.

Graphs can be split into two disjoint sub-graphs by either:

(1) Disconnecting a branch from a node. This is carried out by removing the branch from the adjacent_branch_list of the node, decrementing the node rank, and creating a new node at the free edge of the disconnected branch. Similarly, graphs can also be split by disconnecting several branches from several nodes; or (2) Splitting a branch in a branch pixel. This is carried out by creating two new branches from the split branch, and two new nodes at the free edge of these two new branches.

5. IMAGE RECONSTRUCTION

After splitting the graph into individual sub-graphs, images of the individual characters are reconstructed from these sub-graphs in step 250.

Reconstruction of the image from the modified skeleton is carried out by convolving the skeleton image with a parallelogram whose diagonals are determined by the depth vector. For each skeleton pixel with depth vector of (depth, u,d,r,l) all the pixels that are included inside a parallelogram that is centred on the skeleton pixel location and whose half diagonals from the centre towards the 4 major directions are: depth−1+u, depth−1+d, depth−1+r, depth−1+l, for the up, down, right, left half-diagonals respectively are coloured black.

For example: for a skeleton pixel with depth vector of (2,0,0,0,1), the parallelogram centred on the pixel location (marked by 'o') is shown in FIG. 8a, where the 'x' pixels are resulted from the depth value and the '*' pixels are due to the adjustment 1-bit.

For a skeleton pixel with depth vector of (3,0,1,1,0) the parallelogram centred on the pixel location (marked by 'o') is shown in FIG. 8b.

Finally, the reconstructed image from the skeleton image of the previous section, shown in FIG. 3e, is shown in FIG. 8c, where the '.' pixels are original pixels which were not reconstructed.

Thus, it can be seen that, apart from edge pixels, the reconstructed image is very similar to the original image.

The examples shown in FIGS. 4–7 and FIGS. 9 and 10 illustrate the steps through which the separation algorithm proceeds. It shows the four aforementioned types of graph splits and the use of the algorithm to split long strings into unknown number of digits.

FIG. 4 shows an MBG Graph split in a single node. FIG. 5 shows an MBG Graph split in two nodes simultaneously. FIG. 6 shows an MBG Graph split in two nodes simultaneously while duplicating the branch connecting them. The criterion used to decide on whether to duplicate this branch or not is whether the path along the branch or branches connecting the two nodes in which the split occur is sufficiently linear. Duplication is carried out by using half of the depth of the original path for the duplicated branches, with some smoothing at the branch edges. Improved smoothing techniques of the branch edges would have resulted in better reconstructed images than presented in these examples.

FIG. 7 shows an SBG graph split. In this example some graph smoothing was carried out to illustrate that the graph is basically an SBG graph.

Figures 9, 10:
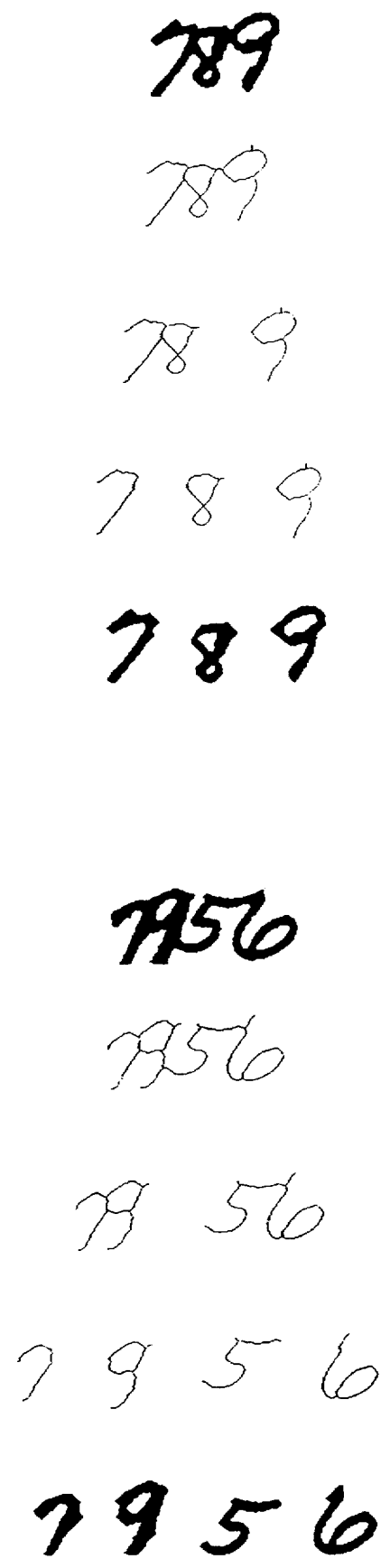

FIG. 9 shows split steps in a string of three touching digits. The first GSS separates the "9" from the "78" (a single node type split). The second GSS separates the "78" into its components while leaving the "9" sub-graph untouched.

FIG. 10 shows a split of a string of 4 touching digits. Two subsequent GSS procedures are used, where the second GSS separates the outcome of the first GSS.

It will be understood that, the skeleton/reconstruction pair of algorithms used in this embodiment may be replaced by any other pair as long as a topological representation may be generated from the image skeleton.

Moreover, another cost function could be chosen according to the application. For numerals, the cost function preferably should adhere to the principles specified above. Also, a different set of parameters might be used in the cost function described above for different types of handwritten styles. In some instances, MBG graphs might also be separated in branch pixels, although it has been found that in most cases separating in graph nodes is preferable. In any case, MBG graph split in nodes preferably should have higher priority than splitting them in branch pixels.

Various heuristics may be introduced for reducing the number of split options.

It will be understood that if the OCR module can accept a skeleton image as its input, the image reconstruction stage, and the ability of the skeletonisation algorithm to allow reconstruction, may not be required.

We claim:

1. Optical character recognition apparatus for recognizing an image comprising connected characters, the apparatus comprising:

optical character recognition logic for associating single character codes with images; and image processing means for splitting into component character images, for subsequent storage or processing by OCR apparatus, character images in digital form comprising connected characters, the image processing apparatus comprising:

logic means for extracting an image skeleton from an input image and representing the topology of the image skeleton in a first data structure including the location of each pixel of the image skeleton, and a depth value means for each pixel of the image skeleton and data identifying nodes and branch pixels of the image skeleton;

logic means for generating, from the first data structure, second data structures representing the topologies of possible output skeletons based on splits of the input image skeleton at different nodes in the first data structure which second data structures contain different distance vector depth value means and node and branch information than the first data structure based on the splits, wherein the depth value means of the first data structure and the second data structure are for defining each of the pixels therein in terms of an outer contour of the character image represented by the data structure;

means for evaluating the second data structures, comprising means for defining a cost function for each of the possible splits and means for evaluating the cost function from the second data structures; and means for selecting one of the possible splits that has a cost function that does not divide the first data structure to produce a second data structure that represents only a part of a character to thereby split the input image.

2. Method for splitting into component character images, for subsequent storage or processing by OCR apparatus, character images in digital form comprising connected characters, the method comprising the steps of:

extracting an image skeleton from an input image and representing the topology of the image skeleton in a first data structure defining the skeleton in terms of contour information of the input image;

generating, from the first data structure, second data structures representing the topologies of images resulting from possible splits of the input image skeleton each second data structure including contour information of the input image that has been modified to reflect a possible split;

evaluating the second data structures by defining a cost function for each of the possible splits and evaluating the cost function from the second data structure; and selecting one of the possible splits to thereby split the input image.

3. Image processing apparatus for splitting into component character images, for subsequent storage or processing by OCR apparatus, character images in digital form comprising connected characters, the image processing apparatus comprising:

logic for extracting an image skeleton from an input image and representing the topology of the image skeleton in a first data structure;

logic for generating, from the first data structure, second data structures representing the topologies of the results of possible splits of the input image skeleton; wherein the first and second data structures are graphs and subgraphs respectively each comprising depth vector information and nodes and branches identified by said depth vector information; wherein the depth vector information comprises a plurality of depth components representing the distance from each pixel in the image skeleton to the outer contour of the character image and a like plurality of four error components each giving the location of the image skeleton relative to the position of an image skeleton pixel of the depth vector in each of four major directions, up, down, left and right, respectively;

means for evaluating the second data structures, comprising means for defining a cost function for each of the possible splits and means for evaluating the cost function from the second data structure; and means for selecting one of the possible splits to thereby split the input image.

4. The apparatus of claim 3 wherein cost function for a multibranch graph is:

$$\text{MGB cost} = \alpha_1 L_x/X + \alpha_2 Y - L_y/Y + \alpha_3 L_x/X_{min}$$

and the cost for a single branch graph is:

$$\text{SBG cost} = \beta_1 Y - L_y/Y + \beta_2 L_x/X_{max} + \beta_3 L_x/X_{min}$$

where:

$LER_i$ the Least Enclosing Rectangle of the i-th subgraph (i=1, 2)

Y the overall height of the underlying image of the graph

X the overall width of the underlying image of the graph $L_x$ the overlap between the two LERs along the x-axis $L_y$ the overlap between the two LERs along the y-axis $Y_{min}$ the height of the shorter LER $X_{min}$ the width of the narrower LER $X_{max}$ the width of the wider LET $\alpha_{iy}$ weighting coefficients $\beta_i$ weighting coefficients.

5. The apparatus of claim 4 wherein the values for the weighting coefficients for handwritten text are:

$\alpha_1 = 0.30$, $\alpha_2 = 0.55$, $\alpha_3 = 0.15$, $\beta_1 = 0.60$, $\beta_2 = 0.25$, $\beta_3 = 0.15$.

6. The apparatus of claim 1 wherein the depth value means includes a five dimension depth vector (depth, u, d, r, l) where "depth" is the location of the skeleton pixel in the number of pixels to the nearest white pixel of the image in one direction and "u", "d", "r", "l" are adjustment bits to adjust the pixel location ½ a pixel in the up, down, right and left directions respectively.

7. The apparatus of claim 6 including means for regenerating the shape of the split images to provide a shape to the separated images that is similar to their shape in the original image.

8. The method of claim 2 wherein the defining of the image skeletons in the first and second data structure includes providing a five dimension depth vector (depth, u, d, r, l) for each skeleton pixel in the image skeleton where "depth" is the number of pixels to the nearest white pixel of the image in one direction and "u", "d", "r", "l" are adjustment bits to adjust the pixel location ½ a pixel in the up, down, right and left directions respectively.

9. The method of claim 2 including using the modified contour information to regenerate the shape of the split images to provide a shape to the separated images that is similar to their shape in the original image.

10. The method of claim 8 including using of the depth vectors to regenerate the shape of the split images to provide a shape to the separated images that is similar to the original image.

11. The method of claim 10 including coloring black all the pixels that are included inside a parallelogram that is centered on each skeleton pixel location and whose half diagonals from the center towards the four major directions are: depth−1+u, depth−1+d, depth−1+r and depth−1+l for the up, down, right and left half diagonals respectively to regenerate the split character shape.

12. The method of claim 9 including feeding the split images with regenerated shape to an optical character reader for recognition.

13. The method of claim 11 including feeding the split images with regenerated shapes to an optical character reader for recognition.

14. Apparatus as claimed in claim 3 wherein the cost function is based on the row and column overlap of least enclosing rectangles bounding the image skeletons represented by the second data structures.

15. Method as claimed in claim 2 comprising iteratively segmenting the images represented by the second data structures by generating, from the second data structures, further data structures representing the topologies of the results of possible splits of the image skeletons represented by the second data structures; and evaluating and splitting the further data structures until the input image is segmented into images containing single characters.

16. The apparatus as claimed in claim 3 including means for regenerating the shape of the split characters in modified form from the depth vectors of the second data structures and for feeding these modified characters to the OCR for recognition.

* * * * *